United States Patent [19]

Bonikowski et al.

[11] 4,221,947
[45] Sep. 9, 1980

[54] ANNEALING OF WIRE

[75] Inventors: Zbigniew Bonikowski, Buckinghamshire; Bruce H. Keen, Surrey; Dennis M. Salamon, Liverpool; John A. Tennant, Merseyside, all of England

[73] Assignee: BICC Limited, London, England

[21] Appl. No.: 885,390

[22] Filed: Mar. 10, 1978

[30] Foreign Application Priority Data

Mar. 14, 1977 [GB] United Kingdom ............... 10670/77

[51] Int. Cl.² .............................................. H05B 5/08
[52] U.S. Cl. ........................... 219/10.41; 219/10.61 R;
219/155; 266/129
[58] Field of Search ................... 219/10.41, 10.61, 7.5,
219/10.57, 10.67, 10.69, 10.71, 10.75, 155;
266/129; 148/147, 150, 154, 156

[56] References Cited

U.S. PATENT DOCUMENTS

| 2,459,507 | 1/1949 | Denham | 219/10.61 |
| 3,117,209 | 1/1964 | Peltier | 219/10.61 |
| 3,182,167 | 5/1965 | McBrien | 219/10.61 |
| 3,871,205 | 3/1975 | Fenton | 219/7.5 |
| 4,117,295 | 9/1978 | Beach | 219/10.61 R |
| 4,118,617 | 10/1978 | Moreau | 219/10.61 R |

FOREIGN PATENT DOCUMENTS

| 756565 | 9/1956 | United Kingdom | 219/10.61 R |
| 943268 | 12/1963 | United Kingdom | 219/155 |
| 947722 | 1/1964 | United Kingdom | 219/10.61 R |
| 1238367 | 7/1971 | United Kingdom | 219/10.61 R |
| 1381813 | 1/1975 | United Kingdom | 219/10.61 R |
| 209503 | 3/1968 | U.S.S.R. | 219/155 |
| 255960 | 4/1970 | U.S.S.R. | 219/155 |
| 397544 | 1/1974 | U.S.S.R. | 219/10.61 R |

*Primary Examiner*—B. A. Reynolds
*Assistant Examiner*—Philip H. Leung
*Attorney, Agent, or Firm*—Buell, Blenko & Ziesenheim

[57] ABSTRACT

In a method of continuously heating wire by induction, a short circuit electrical connection between wire entering a loop or loops, constituting the secondary winding of a transformer, and wire leaving the loop or loops is effcted by guiding a portion of advancing wire on to one of two pulleys, arranged on opposite sides of the transformer core, and guiding a portion of the advancing wire off this pulley in such a way that the portions of wire cross, but are not intertwined with, one another to form the loop or loops. The advancing wire entering and leaving the loop or loops is maintained under such tension that the position in space of the crossover is substantially constant and that the cross portions of the advancing wire are in continuous physical contact, the contact pressure at the position of crossover being sufficient to disturb any electrically non-conductive layers on the wire to provide clean portions for electrical contact. The method is especially applicable to the continuous annealing of the aluminium wire.

15 Claims, 2 Drawing Figures

ANNEALING OF WIRE

This invention relates to continuous inductive heating of a bare flexible elongate member of electrically conductive material such as wire, strip, tape or the like, all such bare flexible elongate electrically conductive members hereinafter, for convenience, being included in the generic term "wire", and is especially, but not exclusively concerned with the continuous annealing of wire by inductive heating.

In a known method of continuously heating wire by induction, wire moving continuously in the direction of its length is caused to form at least one loop that encircles a part of a transformer core carrying a primary winding which is spaced from the loop or loops and which is connected to a source of alternating current by passing the advancing wire over at least two pulleys arranged on opposite sides of the transformer core. A short circuit electrical connection is effected between wire entering the loop or loops and wire leaving the loop or loops so that the or each loop forms the whole or a part of a secondary winding. When alternating current is caused to flow through the primary winding, a circulatory electric current is induced in, and flows around, the or each loop and this induced current heats the continuously moving wire. The aforesaid method of continuously heating wire by induction will hereinafter be referred to as "the method as hereinbefore described".

In continuously annealing wire by inductive heating using the method as hereinbefore described, many techniques have been proposed for effecting the short circuit electrical connection between wire entering the loop or loops and wire leaving the loop or loops. In one technique, one of the pulleys over which the or each loop is formed is made of electrically conductive material and provides the required short circuit connection. In a modification of the aforesaid technique, over an arcuate portion of the circumferential surface of the electrically conductive pulley wire leaving the loop underlies and is maintained in electrical contact with, wire entering the loop. In an alternative technique, the portions of wire entering and leaving the loop or loops are continuously maintained in electrical contact by guiding them in a mutually intertwined relationship in the form of a tie which remains in a substantially constant position whilst the portions of wire pass therethrough.

All of these known techniques of effecting the short circuit electrical connection between wire entering and leaving the loop or loops have the serious disadvantage that substantial sparking occurs between the wire and the pulley and/or between portions of the wire itself. Sparking between the wire and the pulley causes wear and pitting of the pulley and/or spark-induced erosion of the wire surface; where a rubbing wire-to-wire contact is relied on, damage to the wire surface is caused by spark-induced erosion and/or by abrasion at the rubbing point. We have found that the disadvantages arising from the use of these known techniques of effecting a short circuit connection of the or each loop are accentuated where the wire is of aluminium or of an aluminium-based alloy and carries and usual oxide film on its surface.

It is an object of the present invention to provide, in the method of continuously heating wire by induction as hereinbefore described, an improved technique for effecting a short circuit electrical connection between wire entering the loop or loops and wire leaving the loop or loops.

According to the invention, in the method of continuously heating wire by induction as hereinbefore described, the short circuit electrical connection between wire entering the loop or loops and wire leaving the loop or loops is effected by guiding a portion of advancing wire on to one of the pulleys and guiding a portion of the advancing wire off said pulley in such a way that said portions of wire cross, but are not intertwined with, one another to form said loop or loops, and maintaining the advancing wire entering and leaving the loop or loops under such tension that the position in space of the crossover is substantially constant and that the crossed portions of the advancing wire are in continuous physical contact, the contact pressure at the position of crossover being sufficient to disturb any electrically non-conductive layers on the wire to provide clean portions for electrical contact.

SInce the areas of the portions of advancing wire which, at the position of crossover, are in physical contact are very small, the non-conductive layer on each portion is disturbed by pressure and friction and, as a result, intimate contact between clean parts of the surfaces of the portions of wire is obtained. As a consequence, no perceptible sparking occurs between the crossed portions of advancing wire and there is substantially no damage to the wire surface by spark-induced erosion. The method of the invention is therefore especially, but not exclusively, suitable for continuously heating wire of aluminium or an aluminium-based alloy.

In addition, since the short circuit electrical connection is maintained at the position where the crossed portions of advancing wire are in continuous physical contact, there is no necessity for said pulley to be of electrically conductive material and, preferably, to eliminate any risk of sparking between the wire and this pulley, the pulley is made of electrically insulating material.

Furthermore, since the position in space of the crossover is substantially constant, the length of wire forming the loop or loops is also substantially constant.

Preferably, the tension in the wire entering the loop or loops is continuously controlled by means of an appropriate tension control device upstream of the pulleys around which the loop or loops of wire is or are formed, a preferred tension control device being that described in U.S. Pat. No. 3,233,397 of Z. Bonikowski dated Feb. 8, 1966, and the tension in the wire leaving the loop or loops is continuously controlled by appropriate adjustment of drive means drawing the wire through the heating apparatus a preferred drive means being a known form of D.C. motordriven capstan.

The tension at which advancing wire entering and leaving the loop or loops is maintained in order that the crossed portions of the advancing wire are in continuous physical contact at the required contact pressure and that the position in space of the crossover is maintained substantially constant is dependent upon the line speed of the travelling wire and the temperature to which the wire is to be heated.

Where the line speed of the travelling wire is high, for example in excess of about 1200 m/min, preferably at least one of the pulleys around which the loop or loops is or are formed is driven by drive means independent of the means drawing the wire through the heating apparatus with a view to isolating the tension in the wire entering the loop or loops from the tension in the wire leaving the loop or loops. Which of these pulleys is driven depends to a large extent on the material of the wire and the temperature to which it is to be heated. Where the wire travelling around the loop or loops is to be heated to a temperature sufficiently high for the travelling wire to be continuously annealed and for the wire travelling around the loop or loops to be substantially softer than the wire entering the loop or loops, it is preferred to drive by said independent drive means that one of the pulleys at which a portion of advancing wire entering the loop or loops and a portion of advancing wire leaving the loop or loops cross, thereby ensuring that the tension in the wire travelling around the loop or loops is substantially less than the tension in the wire entering the loop or loops and thus substantially reducing the risk of wire breakage at high line speeds. Where, prior to a wire-coating process, the wire travelling around the loop or loops is to be pre-heated to a temperature substantially less than the annealing temperature and wire entering the loop or loops and wire travelling around the loop or loops have substantially the same mechanical characteristics, it is preferred to drive by said independent drive means the or a pulley remote from the pulley at which portions of wire entering and leaving the loop or loops cross, thereby ensuring that the tension in wire travelling from said driven pulley is substantially less than the tension in wire travelling to said driven pulley and the position in space of the crossover is maintained substantially constant.

If cooling of the heated wire is to be effected by causing the travelling wire to pass through quenching apparatus in which cold water is directed on to the travelling wire, preferably at least one pulley guiding wire through the quenching apparatus is driven by means independent of the means drawing the wire around the pulleys for the purpose of overcoming drag caused by water from the quenching apparatus.

The portions of advancing wire may cross at any convenient angle to one another having regard to the space available and to the design of the apparatus to be employed, the minimum area of interfacial contact being obtained when the portions of wire cross at approximately 90° to one another. We prefer to arrange that at the position at which the portions of advancing wire cross one another, the axes of the crossing portions of wire are inclined to one another at an angle lying in the range 15° to 50°.

In travelling to and from the pulleys positioned on opposite sides of the transformer core of an inductive heating apparatus, it is the usual practice for the advancing wire to pass over guide pulleys which, to overcome excessive drag on the wire, are driven in synchronism either directly or through variable torque couplings. We have found that use of driven guide pulleys can lead to turbulent behaviour of the wire followed by fracture when the peripheral speeds of the pulleys do not correspond—as may be the case where a pulley is worn—or when the torque couplings are not in precise adjustment. Accordingly, it is preferred to guide the advancing wire to and from the loop or loops by means of freely rotatable pulleys which revolve independently of one another and therefore adjust automatically to the actual speed of the advancing wire.

The invention also includes apparatus for continuously heating wire by the method as hereinbefore described, using the improved technique of effecting a short circuit electrical connection between the wire entering and leaving the loop or loops as above described.

The invention further includes wire that has been heated by the aforesaid method and employing the aforesaid improved technique for effecting a short circuit electrical connection.

The improved method of and apparatus for continuously heating wire by induction is especially suitable for use in line with and downstream of a wire-drawing process and apparatus and/or for use in line with and upstream of an extrusion machine or other wire-coating process and apparatus.

The invention is further illustrated by a description, by way of example, of the preferred method of and apparatus for continuously annealing aluminium wire travelling at a line speed up to 2000 m/min with reference to the accompanying drawings, in which.

Figure 1:
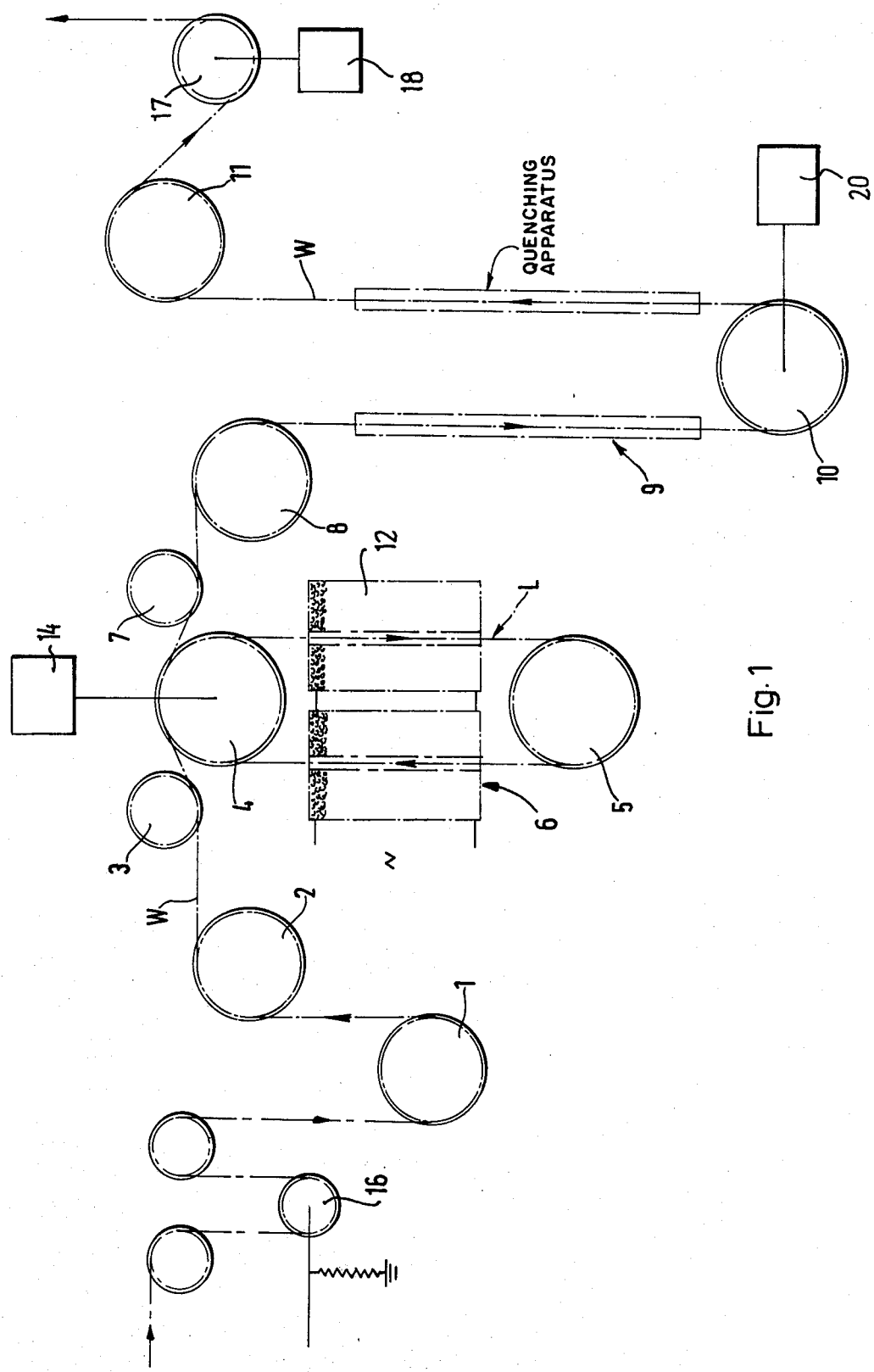
FIG. 1 is a diagrammatic representation of the apparatus.
Figure 2:
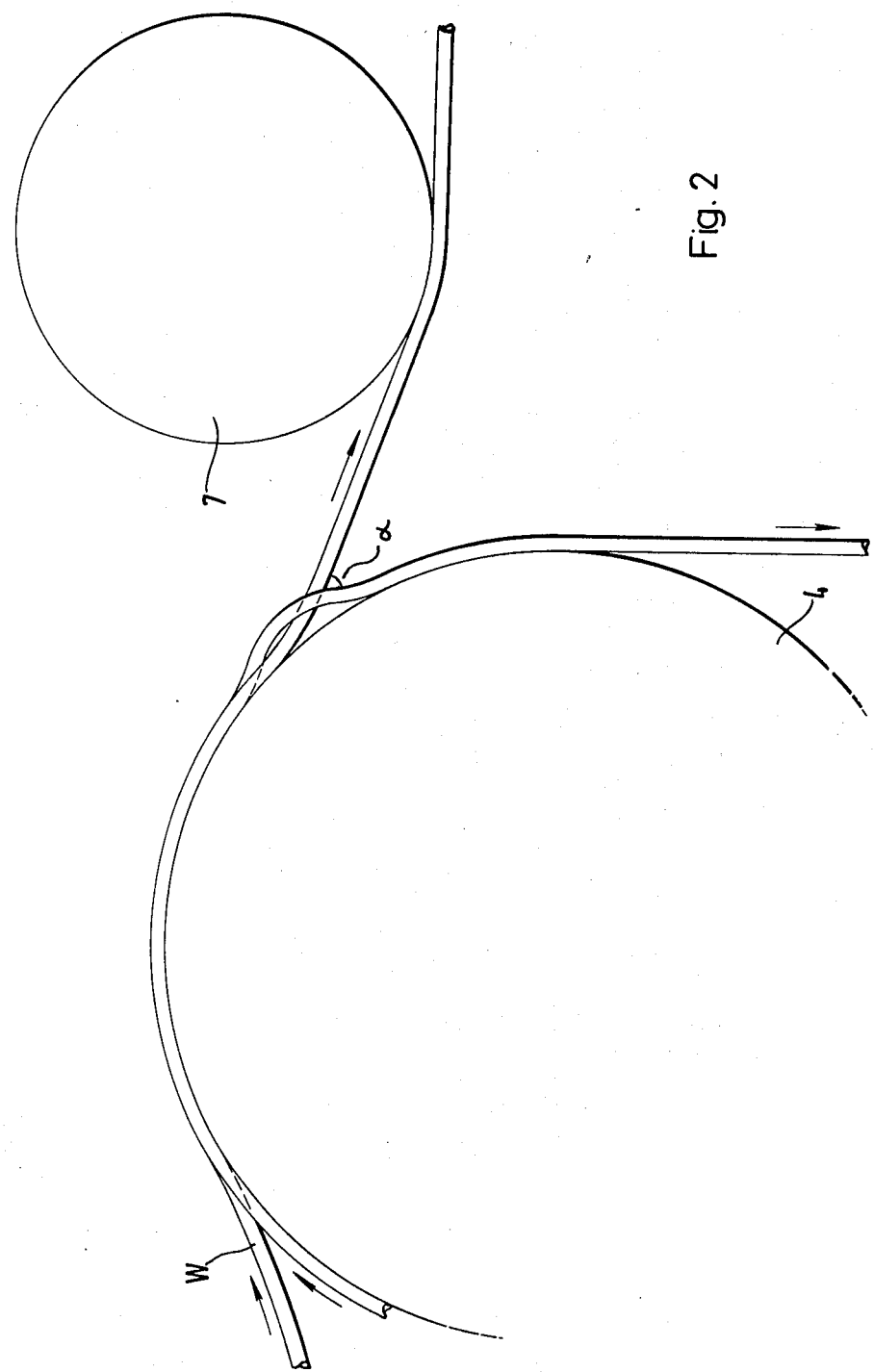
FIG. 2 is a fragmental view of the apparatus, drawn on a larger scale, showing the crossed portions of advancing wire.

Referring to the drawings, the apparatus comprises three guide pulleys 1, 2 and 3, two pulleys 4 and 5 mounted on opposite sides of a transformer core 6 having a primary winding 12 fed from a source of alternating current, guide pulleys 7 and 8, a guide pulley 10 positioned at the foot of quenching apparatus 9, and a guide pulley 11. The guide pulleys 1, 2, 3, 7, 8 and 11 and the pulley 5 are each freely rotatable. The pulley 4 has an associated independently controlled drive motor 14 and the pulley 10 has an associated independently controlled drive motor 20, rotation of the pulley 4 being motor assisted when the wire is required to travel at a speed in excess of about 1500 m/min and rotation of the pulley 10 being continuously motor assisted to compensate for drag caused by water from the quenching apparatus 9.

In use, wire W travelling from a wire-drawing machine device 16 of the kind described in U.S. Pat. No. 3,233,397 passes through tension control means device 16 of the kind described in U.S. Pat. No. 3,233,397, over pulleys 1, 2 and 3 to pulley 4, and from pulley 4 travels to pulley 5 and from pulley 5 back to pulley 4 to form a loop L. As it travels around the upper part of the pulley 4 and travels to the pulley 7, the hot soft portion of advancing wire crosses under the cold stiff portion of advancing wire so that the axes of the crossing portions of wire are inclined to one another at an angle $\alpha$ lying in the range 15°–50°, the tension in the advancing wire being drawn by a capstan 17 driven by a D.C. motor 18 (not shown) through the annealing apparatus being sufficient to maintain the crossed portions of wire in continuous physical contact and the position in space of the crossover substantially constant. The loop L constitutes the secondary winding of the transformer core 6. After passing over the guide pulleys 7 and 8, the hot wire W travels through the first part of the quenching apparatus 9, around the motor assisted pulley 10 and through the second part of the quenching apparatus to the guide pulley 11 from where it travels to a finishing die (not shown) and thence to a plastics extrusion machine (not shown).

By way of example, in using the apparatus illustrated in annealing aluminium wire having a diameter in the range 0.3 to 1.0 mm and travelling at a line speed up to 2000 m/min, the tension of the wire entering the loop L is maintained in the range 1N to 10N and the tension of the wire leaving the loop L is maintained in the range 2N to 15N.

The method of continuously heating wire by induction as hereinbefore described in which the aforesaid improved technique of effecting a short circuit electrical connection is employed has the additional important advantage that, as compared with the above-described known methods of continuously heating wire by induction, the electrical power required is substantially less.

What we claim as our invention is:

1. A method of continuously heating wire by induction in which wire moving continuously in the direction of its length is caused to form at least one loop that encircles a part of a transformer core carrying a primary winding which is spaced from the loop or loops and which is connected to a source of alternating current by passing the advancing wire over at least two pulleys arranged on opposite sides of the transformer core; a short circuit electrical connection is effected between wire entering the loop or loops and wire leaving the loop or loops so that the or each loop forms at least a part of a secondary winding; and, when alternating current is caused to flow through the primary winding, a circulatory electric current is induced in, and flows around the or each loop and heats the continuously moving wire, wherein the short circuit electrical connection between wire entering the loop or loops and wire leaving the loop or loops is effected by guiding a portion of advancing wire on to one of the pulleys and guiding a portion of the advancing wire off said pulley in such a way that said portions of wire cross, but are not intertwined with, one another to form said loop or loops, and maintaining the advancing wire entering and leaving the loop or loops under such tension that the position in space of the crossover is substantially constant and that the crossed portions of the advancing wire are in continuous physical contact, the contact pressure at the position of crossover being sufficient to disturb any electrically non-conductive layers on the wire to provide clean portions for electrical contact.

2. A method as claimed in claim 1, wherein the travelling wire is heated to such a temperature that it is continuously annealed.

3. A method as claimed in claim 1, wherein the wire is of aluminium or an aluminium based alloy.

4. A method of continuously heating wire by induction in which wire moving continuously in the direction of its length is caused to form at least one loop that encircles a part of a transformer core carrying a primary winding which is spaced from the loop or loops and which is connected to a source of alternating current by passing the advancing wire over at least two pulleys arranged on opposite sides of the transformer core; a short circuit electrical connection is effected between wire entering the loop or loops and wire leaving the loop or loops so that the or each loop forms at least a part of a secondary winding; and, when alternating current is caused to flow through the primary winding, a circulatory electric current is induced in, and flows around the or each loop and heats the continuously moving wire, wherein the short circuit electrical connection between wire entering the loop or loops and wire leaving the loop or loops is effected by guiding a portion of advancing wire on to one of the pulleys and guiding a portion of the advancing wire off said pulley in such a way that said portions of wire cross, but are not intertwined with, one another to form said loop or loops, and maintaining the advancing wire entering and leaving the loop or loops under such tension that the position in space of the crossover is substantially constant and that the crossed portions of the advancing wire are in continuous physical contact, the contact pressure at the position of crossover being sufficient to disturb any electrically non-conductive layers on the wire to provide clean portions for electrical contact, the tension in the wire entering the loop or loops being continuously controlled by means of a tension control device upstream of said pulleys and the tension in the wire leaving the loop or loops being continuously controlled by means of drive means drawing the wire around said pulleys.

5. A method as claimed in claim 4, wherein at least one of the pulleys around which the loop or loops is or are formed is driven by drive means independent of the means drawing the wire around said pulleys.

6. A method as claimed in claim 5, wherein the wire is heated to such a temperature that wire travelling around the loop or loops is substantially softer than wire entering the loop or loops and wherein the pulley driven by said independent drive means is that one of the pulleys at which portions of wire entering and leaving the loop or loops cross.

7. A method as claimed in claim 5, wherein the wire travelling around the loop or loops is heated to such a temperature that wire entering the loop or loops and wire travelling around the loop or loops have substantially the same mechanical characteristics and wherein the pulley driven by said independent drive means is the pulley that is remote from the pulley at which portions of wire entering and leaving the loop or loops cross.

8. A method of continuously annealing wire of aluminium or an aluminium based alloy by inductive heating in which wire moving continuously in the direction of its length is caused to form at least one loop that encircles a part of a transformer core carrying a primary winding which is spaced from the loop or loops and which is connected to a source of alternating current by passing the advancing wire over at least two pulleys arranged on opposite sides of the transformer core; a short circuit electrical connection is effected between wire entering the loop or loops and wire leaving the loop or loops so that the or each loop forms at least a part of a secondary winding; and, when alternating current is caused to flow through the primary winding, a circulatory electric current is induced in, and flows around, the or each loop and heats the continuously moving wire to such a temperature that it is continuously annealed, wherein the short circuit electrical connection between wire entering the loop or loops and wire leaving the loop or loops is effected by guiding a portion of advancing wire on to one of the pulleys and guiding a portion of the advancing wire off said pulley in such a way that said portions of wire cross, but are not intertwined with, one another to form said loop or loops, and maintaining the advancing wire entering and leaving the loop or loops under such tension that the position in space of the crossover is substantially constant and that the crossed portions of the advancing wire are in continuous physical contact, the contact pressure at the position of crossover being sufficient to disturb any electrically non-conductive oxide layers on the wire to provide clean portions for electrical contact.

9. A method as claimed in claim 8, wherein the tension in the wire entering the loop or loops is continuously controlled by means of a tension control device upstream of said pulleys and the tension in the wire leaving the loop or loops is continuously controlled by means of drive means drawing the wire around said pulleys.

10. A method as claimed in claim 1, wherein heated travelling wire emerging from the loop or loops passes through quenching apparatus in which cooling water is directed on to the travelling wire and wherein at least one pulley guiding wire through the quenching apparatus is driven by means independent of the means drawing the wire around said pulleys.

11. A method as claimed in claim 1, wherein at the position at which the portions of advancing wire cross one another, the axes of the crossing portions of wire and inclined to one another at an angle lying in the range 15° to 50°.

12. A method as claimed in claim 1, wherein the travelling wire is guided to and from the loop or loops by means of freely rotatable pulleys.

13. Apparatus for continuously heating wire by induction by a method in which wire moving continuously in the direction of its length is caused to form at least one loop that encircles a part of a transformer core carrying a primary winding which is spaced from the loop or loops and which is connected to a source of alternating current by passing the advancing wire over at least two pulleys arranged on opposite sides of the transformer core; a short circuit electrical connection is effected between wire entering the loop or loops and wire leaving the loop or loops so that the or each loop forms at least a part of a secondary winding; and, when alternating current is caused to flow through the primary winding, a circulatory electric current is induced in, and flows around, the or each loop and heats the continuously moving wire, which apparatus comprises a transformer core carrying a primary winding; a source of alternating current for connection to said primary winding; at least two pulleys so arranged on opposite sides of the transformer core that wire moving continuously in the direction of its length can be caused to travel around said pulleys to form at least one loop that encircles a part of the transformer core carrying said primary winding and that forms at least a part of a secondary winding; tension control means for continuously controlling the tension in wire travelling toward said pulleys; means for drawing wire around said pulleys; and, associated with at least one of said pulleys, means for rotatably driving said pulley, which means is independent of the means for drawing wire around said pulleys.

14. Apparatus as claimed in claim 13, wherein the pulleys are made of electrically insulating material.

15. Apparatus as claimed in claim 13, wherein quenching apparatus is positioned downstream of said pulleys for directing cooling water on to heated travelling wire and wherein at least one pulley for guiding wire through the quenching apparatus has associated drive means, independent of said means for drawing wire around said pulleys, for assisting in drawing wire through the quenching apparatus.

* * * * *

UNITED STATES PATENT AND TRADEMARK OFFICE
CERTIFICATE OF CORRECTION

PATENT NO. : 4,221,947
DATED : September 9, 1980
INVENTOR(S) : ZBIGNIEW BONIKOWSKI, BRUCE H. KEEN, DENNIS M. SALAMO and JOHN A. TENNANT It is certified that error appears in the above-identified patent and that said Letters Patent are hereby corrected as shown below:

Column 1, line 64, after "carries", "and" snould be --the--.

Column 2, line 21, "SInce" should read --Since--.

Column 4, line 52, "(not shown)" should be deleted.

Signed and Sealed this

Sixth Day of January 1981

[SEAL]

Attest:

SIDNEY A. DIAMOND

Attesting Officer

Commissioner of Patents and Trademarks